United States Patent
Blackwell et al.

(10) Patent No.: US 7,621,981 B2
(45) Date of Patent: Nov. 24, 2009

(54) APPARATUS, SYSTEM, AND METHOD FOR DISPERSING HEAT WITHIN A PARTICULATE FILTER

(75) Inventors: Bryan Blackwell, Brownsburg, IN (US); Conrad J. Simon, III, Columbus, IN (US); Thomas M. Yonushonis, Columbus, IN (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 341 days.

(21) Appl. No.: 11/618,150

(22) Filed: Dec. 29, 2006

(65) Prior Publication Data
US 2008/0155950 A1    Jul. 3, 2008

(51) Int. Cl.
*B01D 39/20* (2006.01)
*B01D 46/00* (2006.01)
*F01N 3/022* (2006.01)

(52) U.S. Cl. .............. 95/273; 55/282.3; 55/385.3; 55/342.2; 55/522; 55/523; 55/524; 55/DIG. 5; 55/DIG. 10; 55/DIG. 30; 60/297; 60/299; 60/311; 422/180; 428/116; 423/213.2; 423/213.5

(58) Field of Classification Search ............... 55/282.2, 55/282.3, 385.3, 342.1, 342.2, 523, 524, 55/DIG. 5, DIG. 10, DIG. 30, 522; 60/295, 60/297, 299, 300, 303, 311; 422/180; 428/116; 95/273, 278; 423/213.2, 213.5
See application file for complete search history.

(56) References Cited

U.S. PATENT DOCUMENTS

| | | | | |
|---|---|---|---|---|
| 4,363,644 A | * | 12/1982 | Sato et al. | 55/523 |
| 4,857,089 A | * | 8/1989 | Kitagawa et al. | 55/523 |
| 6,461,398 B2 | * | 10/2002 | Peters et al. | 55/523 |
| 6,712,884 B2 | * | 3/2004 | Brück et al. | 55/523 |
| 6,753,294 B1 | * | 6/2004 | Brisley et al. | 502/439 |
| 2003/0097834 A1 | * | 5/2003 | Gabe et al. | 60/311 |
| 2004/0047774 A1 | * | 3/2004 | Suwabe et al. | 422/177 |
| 2004/0079631 A1 | | 4/2004 | Birckigt et al. | |
| 2005/0138908 A1 | * | 6/2005 | Kasai et al. | 55/523 |
| 2006/0015376 A1 | | 1/2006 | Sattler et al. | |
| 2006/0191248 A1 | * | 8/2006 | Bardhan et al. | 55/523 |

OTHER PUBLICATIONS

PCT International Search Report and Written Opinion dated Jun. 2, 2008.

* cited by examiner

*Primary Examiner*—Jason M Greene
(74) *Attorney, Agent, or Firm*—Kunzler & McKenzie

(57) ABSTRACT

An apparatus, system, and method are disclosed for dispersing heat within a particulate filter. The apparatus may include various devices for dispersing heat from a high risk portion of the particulate filter by delaying heat generation, by conducting generated heat out of the high risk portion, by absorbing the heat generated into molecular energy rather than temperature, by shifting some of the heat burden away from the particulate filter to other devices in an aftertreatment system, or out of the aftertreatment system. The delaying device may be a reduction of catalyst loading within portions of the particulate filter. The conducting device may be a plurality of thermal conduits within portions of the particulate filter. The absorption device may be a high heat capacity washcoat in portions of the particulate filter.

33 Claims, 11 Drawing Sheets

APPARATUS, SYSTEM, AND METHOD FOR DISPERSING HEAT WITHIN A PARTICULATE FILTER

BACKGROUND OF THE INVENTION

1. Field of the Invention

This invention relates to the thermal protection of particulate filters, and more particularly relates to thermally protecting particulate filters through physical heat dispersion.

2. Description of the Related Art

Recent emissions regulations have required the use of particulate filters in many internal combustion engine applications. The particulate filters capture soot from the exhaust stream, and the captured soot is later oxidized and vented to the atmosphere as carbon dioxide or carbon monoxide. If excessive soot is allowed to build up on the soot filter, the rate of soot oxidation can generate large amounts of heat in a short period of time and cause temperature spikes and large temperature gradients. Temperature spikes can melt the particulate filter, while temperature gradients can cause cracking or other stress related failures.

Conventional technologies try to control temperature spikes by controlling soot oxidation rates. This is usually achieved by limiting the amount of soot that accumulates on the particulate filter before oxidizing the soot in a regeneration event. While some of the conventional technologies have markedly improved the reliability and service life of particulate filters, there are still some problems that conventional technologies have not solved. Estimating the amount of soot on a particulate filter is an exceedingly difficult task, and direct measurements of soot are not currently available. Analogs for measuring soot, such as measuring the pressure drop across the particulate filter, have limitations in many applications due to low exhaust flow rates and uneven soot distribution within the particulate filter. Even when an overall soot estimate in a particulate filter is available and accurate, localized soot concentrations can occur within the particulate filter.

Further, conventional technologies can still be subject to failures even when the technology is working perfectly. For example, the soot estimation may be functional, but the application may operate in a manner that prevents regeneration of the particulate filter for extended periods of time due to insufficient temperature generation. Further, a sensor or other failure may prevent the soot estimator from generating a soot estimate even if the soot estimator is functioning properly. In these and similar cases, a high temperature regeneration of the particulate filter can cause a large temperature spike or gradient and damage the particulate filter.

Within the wall flow particulate filter where exhaust flow is forced through the substrate wall of the particulate filter, the highest nominal concentrations of soot occur at the end of soot channels. A zone near the exit of the particulate filter tends to experience the highest soot loadings, and therefore the highest soot oxidation exotherms. The center of the particulate filter tends to experience the highest temperatures because the surrounding particulate filter insulates the center and slows heat transfer to the environment.

These effects combine such that the vast majority of temperature related failures in particulate filters occur in a centralized zone near the downstream side of the particulate filter. The exact size and shape of this zone, which may be called the high risk portion of the particulate filter, can vary according to the particular application, the type and amount of soot deposition within the particulate filter, the availability and type of regenerations experienced by the soot filter, and the ambient environment and insulation of the particulate filter. Those of skill in the art learn the high risk portions of a given application through field experience and standard analysis of failed particulate filters.

The physical protections available for particulate filters in the current art have shortcomings. Two primary methods are currently used to protect the particulate filter. The first is to manufacture the particulate filter completely out of a material that can withstand extreme temperatures and temperature gradients. The second is to manufacture the particulate filter substrate such that the particulate filter has a large overall thermal mass or heat capacity.

A common example of the first method is to manufacture the entire particulate filter out of silicon carbide. While this is a robust material, silicon carbide has some undesirable qualities. For example, silicon carbide has a high specific heat capacity, reducing the ability to reach a soot oxidation temperature, and silicon carbide cannot accept as high of washcoat loadings as some competing materials. Further, even a silicon carbide particulate filter can fail under high temperatures and thermal gradients. Rather than over-designing the entire particulate filter, it would be desirable to focus improvements on the high risk portion of the particulate filter.

A common example of the second method is to manufacture the entire particulate filter with thick channel walls and thereby supply more filter material to be heated. This method has several drawbacks, however. First, the combination of thicker substrate walls and smaller channel areas provides for a greater pressure drop than filters designed to meet filtering criteria rather than temperature resistance criteria. Second, the portion of the particulate filter that is not at high risk also must have a high heat capacity under such a design, since the substrate wall thickness must be experienced throughout the filter. Since all of the thermal mass of the filter must be heated during a regeneration event, it is less fuel efficient to perform a regeneration in such a filter. Further, applications which can only marginally achieve a regeneration under normal circumstances may not be able to achieve a regeneration in an application where the entire filter has a high heat capacity.

From the foregoing discussion, it should be apparent that a need exists for an apparatus, system, and method that provides for dispersing heat within a particulate filter such that temperature spikes and gradients are avoided. Beneficially, such an apparatus, system, and method would disperse heat through time, space, molecular energy storage, and across aftertreatment components.

SUMMARY OF THE INVENTION

The present invention has been developed in response to the present state of the art, and in particular, in response to the problems and needs in the art that have not yet been fully solved by currently available particulate filter systems. Accordingly, the present invention has been developed to provide an apparatus, system, and method for heat dispersion within a particulate filter that overcome many or all of the above-discussed shortcomings in the art.

An apparatus is provided to disperse heat within a particulate filter. The apparatus may have a plurality of thermal conduits configured to thermally connect a high risk portion of the particulate filter with the ambient environment. The high risk portion of the particulate filter may be an area from the rear of the particulate filter, defined as the downstream end where exhaust gas exits, forward at least one-sixth of the axial length of the particulate filter. The high risk portion may further comprise a central portion of the particulate filter, including at least ten percent of the cross-sectional area of the particulate filter at the rear of the filter. The plurality of thermal conduits may comprise metal wire, material fibers, or structures manufactured in the channels of the particulate filter. The thermal connection to the ambient environment may comprise a connection to channel end caps at the rear of the particulate filter.

The high risk portion of the particulate filter may comprise a cylinder with a constant cross-section from the rear of the high risk portion to the front of the high risk portion. The high risk portion may also comprise any cross-sectional shape, including a cross-sectional shape that varies through the high risk portion. The high risk portion may comprise a frustum with the basic shape of the high risk portion corresponding to the shape of the particulate filter. In one embodiment, the high risk portion may comprise a prolate hemi-spheroid with a major axis axially aligned with the particulate filter.

The apparatus may further include a washcoat on the particulate filter comprising a reduced precious metal catalyst loading in the high risk portion of the particulate filter. The reduced precious metal catalyst loading may be configured to reduce the rate of soot oxidation and subsequent heat generation in the particulate filter. The apparatus may further include a washcoat on the particulate filter comprising a heat sink material deposited in the high risk portion of the particulate filter. The heat sink material may be configured to absorb some of the heat generated in the particulate filter and reduce peak temperatures and temperature gradients reached in the particulate filter.

In one embodiment, the apparatus may include a washcoat on the particulate filter with substantially zero precious metal loading in the washcoat. The apparatus may thereby partially oxidize soot from carbon to carbon monoxide instead of completely to carbon dioxide, thereby generating less heat within the particulate filter. The apparatus may further include a catalytic component downstream of the particulate filter configured to convert carbon monoxide to carbon dioxide.

An apparatus is disclosed for thermal management within a particulate filter in accordance with the present invention. The apparatus may comprise a heat dispersion device comprising at least one of a time dispersion device, a component dispersion device, a molecular energy dispersion device, and a space dispersion device. The time dispersion device may be configured to extend the time over which heat generation occurs within the high risk portion of the particulate filter. The component dispersion device may be configured to disperse heat generation from the high risk portion of the particulate filter to a downstream catalytic component. The molecular energy dispersion device may be configured to store heat generated in the high risk portion of the particulate filter within extra mass and within molecular quantum vibrations to limit temperatures achieved within the high risk portion of the particulate filter. The space dispersion device may be configured to disperse heat generated within the high risk portion of the particulate filter spatially to areas of the particulate filter and ambient environment away from the high risk portion of the particulate filter.

In one embodiment, a method is presented including the operations to provide a robust emissions compliant power plant in accordance with the present invention. The method may include installing an internal combustion engine in an application. The application may be a motor vehicle. The method may further include installing an aftertreatment system in the application configured to treat the exhaust of the internal combustion engine.

The aftertreatment system may comprise a heat-dispersing particulate filter. The heat-dispersing particulate filter may comprise a particulate filter with a washcoat adjustment in a high risk portion of the particulate filter, where the washcoat adjustment comprises one of a reduced precious metal catalyst loading, and a high heat capacity washcoat. The reduced precious metal catalyst loading washcoat may be a reduction to substantially zero percent precious metal catalyst loading. The method may further include installing a catalytic component downstream of the particulate filter configured to convert carbon monoxide to carbon dioxide. The heat-dispersing particulate filter may further comprise a plurality of thermal conduits configured to thermally connect the high risk portion of the particulate filter with the ambient environment.

A system for providing a robust emissions compliant power plant is presented in accordance with the present invention. The system may include an internal combustion engine installed in an application. The system may further include an aftertreatment system comprising a heat-dispersing particulate filter. The heat-dispersing particulate filter may comprise a heat dispersion device comprising at least one of a time dispersion device, a component dispersion device, a molecular energy dispersion device, and a space dispersion device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 11, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
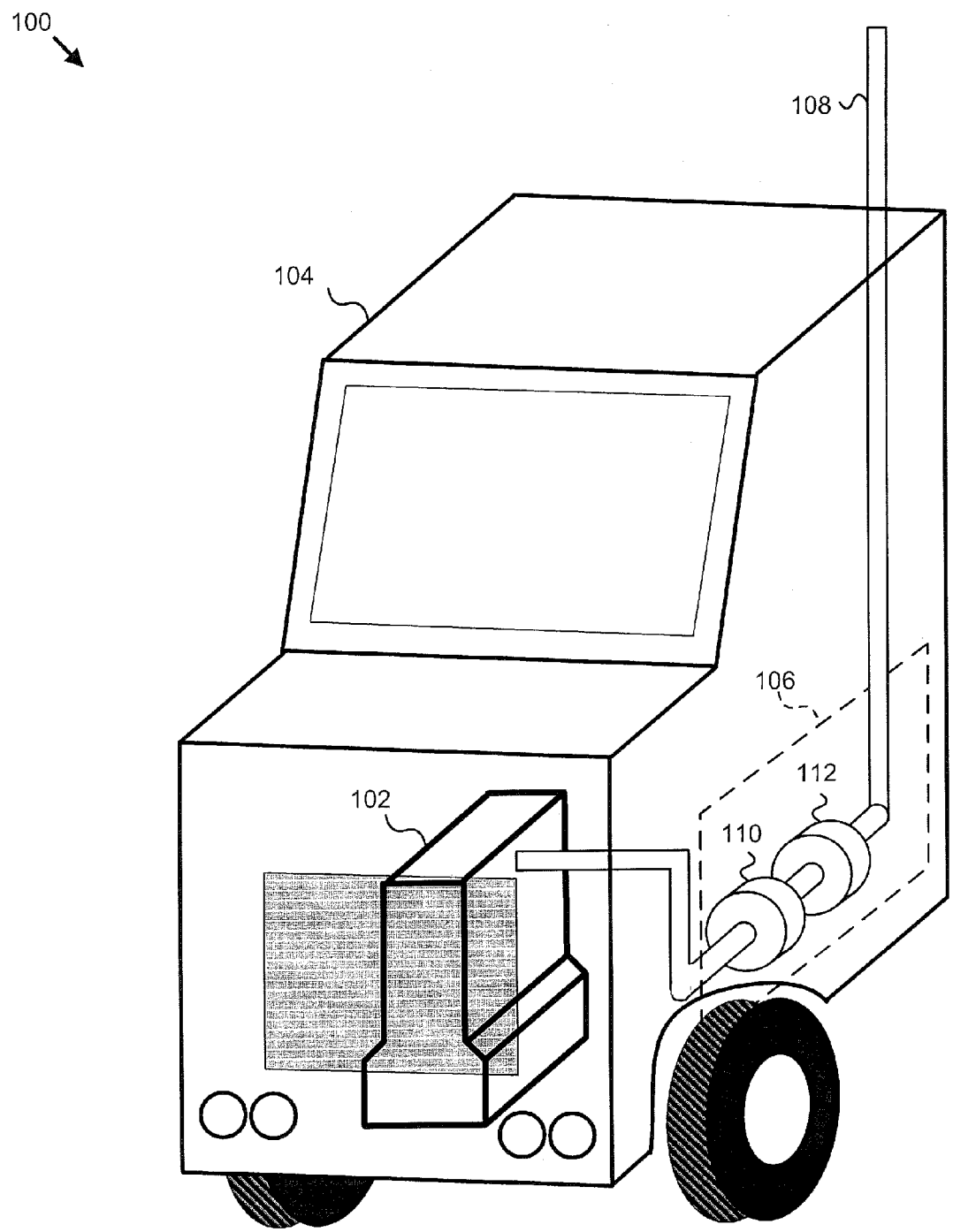
FIG. 1 is a schematic block diagram depicting one embodiment of a system for providing a robust emissions compliant power plant for an application in accordance with the present invention.

FIG. 1 is a schematic block diagram depicting one embodiment of a system 100 for providing a robust emissions compliant power plant for an application in accordance with the present invention. The system 100 may comprise an internal combustion engine 102 installed in an application 104. The application 104 may be a motor vehicle, or the application 104 may be any other device configured to derive work from the engine 102—for example, a pump, a boat, or a drilling rig.

The system 100 may further include an aftertreatment system 106 configured to treat an exhaust stream 108 from the engine 102. The aftertreatment system 106 may comprise a heat-dispersing particulate filter 110. The aftertreatment system 106 may further comprise a catalytic component 112 downstream of the particulate filter 110 configured to convert carbon monoxide to carbon dioxide.

Figure 2:
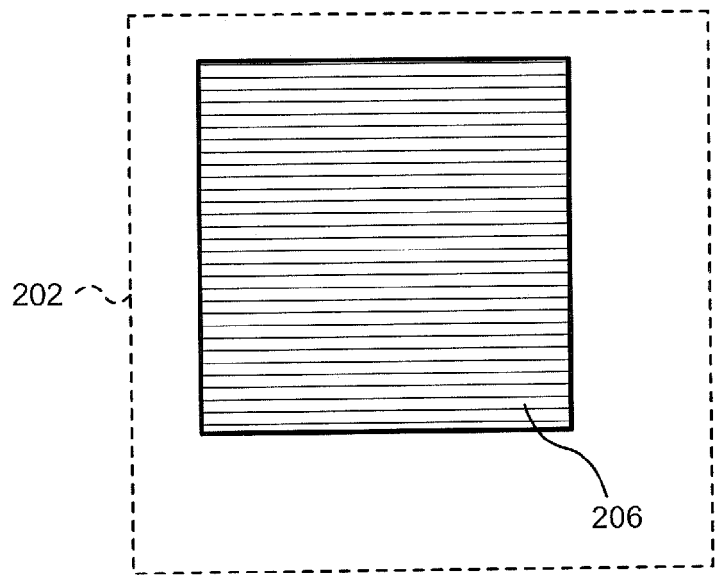
FIG. 2 is a schematic block diagram depicting one embodiment of a particulate filter in accordance with the present invention.
Figure 2:
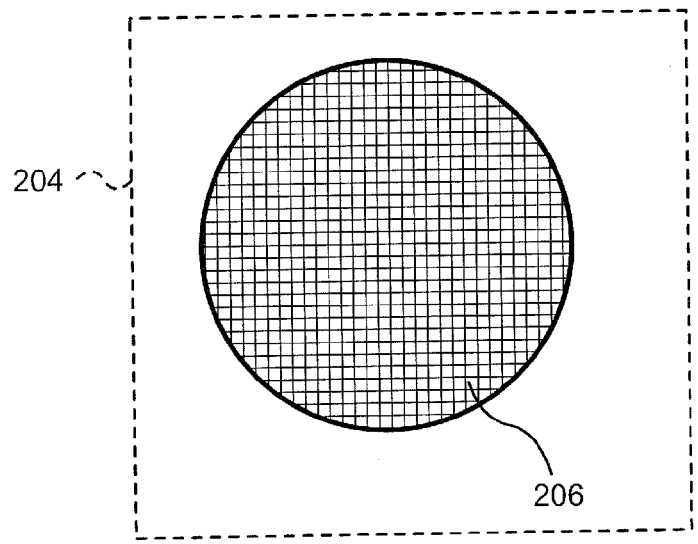
Figure 3:
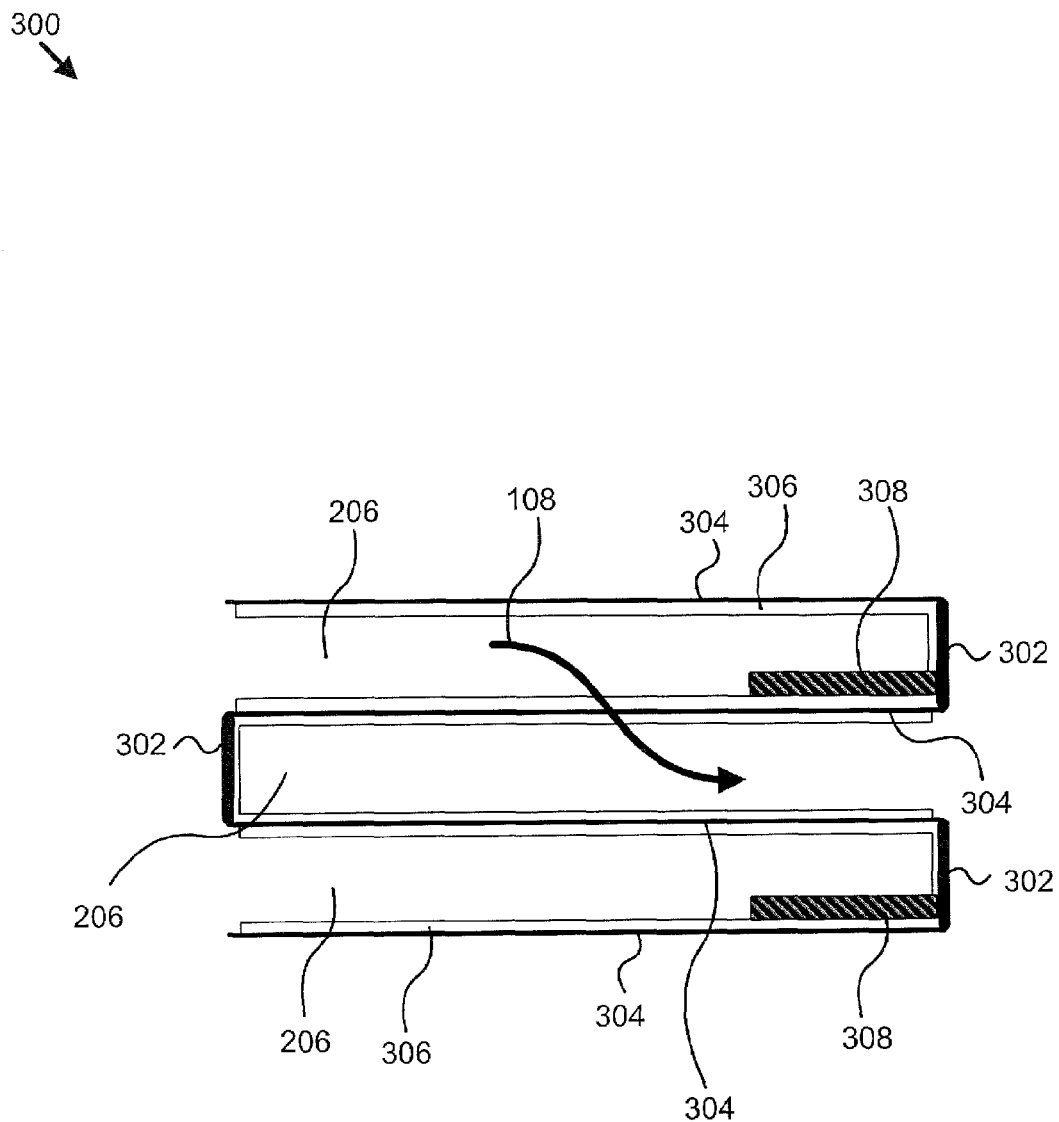
FIG. 3 is a functional, unscaled illustration of channels within a particulate filter in accordance with the present invention.

Referring to FIG. 2, the heat dispersing particulate filter may comprise a plurality of channels 206 as seen in the cutaway side view 202. The face of the filter 204 may comprise a grid of squares, a honeycomb (hexes—not shown), or other shapes. Referring to FIG. 3, adjacent channels 206 may be plugged with an end cap 302, forcing the exhaust flow 108 through the filter substrate 304. For greater clarity, FIG. 3 is not necessarily shown to scale. In a typical embodiment, the length of a channel may be several inches, while the width of a channel 206 may range from less than a millimeter to several millimeters or more. In one embodiment, the filter 110 has a filter face 204 twelve (12) inches in diameter, the channels 206 are twelve (12) inches long and about 1 millimeter from substrate wall 302 to substrate wall 302. The particulate filter 110 may further comprise a washcoat 306 deposited on the filter substrate 304.

Referring back to FIG. 1, the heat dispersing particulate filter 110 may further comprise at least one of a time dispersion device, a component dispersion device, a molecular energy dispersion device, and a space dispersion device. The time dispersion device may be configured to disperse heat generated by regeneration of soot in the particulate filter 110 over time. The component dispersion device may be configured to disperse some of the heat that would normally be generated by regeneration of soot within the particulate filter 110 to be generated within the catalytic component 112, or to be generated in the ambient environment. The molecular energy dispersion device may be configured to disperse heat generated by regeneration of soot in the particulate filter 110 as molecular energy such that the temperature rise within a high risk portion of the particulate filter 110 is low relative to the temperature rise without the molecular energy dispersion device. The space dispersion device may be configured to disperse heat generated by regeneration of soot in the particulate filter 110 spatially from high risk portions of the particulate filter 110 to lower risk portions of the particulate filter 110 and/or to the ambient environment.

The time dispersion device may comprise a reduced precious metal loading in the washcoat 306 on the particulate filter 110 in the high risk portion of the particulate filter 110. The reduced precious metal catalyst loading may slow the oxidation rate of soot within the particulate filter 110, and thereby reduce the maximum temperatures and temperature gradients achieved within the particulate filter 110. The exact amount of catalyst reduction required to achieve the desired soot oxidation rate reduction depends upon the specific application 104.

Simple experimentation by one of skill in the art, including loading the particulate filter 110 to the designed soot loading limit, and performing a soot regeneration at the designed regeneration temperature, will yield the catalyst reduction appropriate for a given application 104. Without limiting the scope of the invention, the peak temperature reduction from reduced catalyst loading is not linear, and a reduction of 70%-90% catalyst loading reduction (i.e. 10%-30% loading remaining) to achieve significant peak temperature reductions may be a typical range for many applications. Therefore, in one embodiment, the reduced precious metal catalyst loading in the high risk portion of the particulate filter 110 may comprise a precious metal catalyst loading between 10 percent and 30 percent of the precious metal catalyst loading on the remainder of the particulate filter 110.

The component dispersion device may comprise a washcoat 306 with zero percent precious metal loading on the particulate filter 110 in the high risk portion of the particulate filter 110. The zero percent precious metal loading may limit the extent of the soot oxidation reaction in the high risk portion of the particulate filter 110 to the production of carbon monoxide rather than carbon dioxide, thereby generating less heat within the high risk portion of the filter 110. In one embodiment, the carbon monoxide is carried with the exhaust stream 108 to the atmosphere where it eventually oxidizes to carbon dioxide. In another embodiment, at least a portion of the carbon monoxide may be oxidized to carbon dioxide within a catalytic component 112, generating the associated heat within the catalytic component 112 and dispersed from the particulate filter 110.

In one embodiment, the system 100 comprises a particulate filter 110 with a time dispersion device and a component dispersion device. In such an embodiment, a first fraction of the high risk portion of the particulate filter 110 may comprise a component dispersion device, or zero percent catalyst loading, and a second fraction of the high risk portion of the particulate filter 110 may comprise a time dispersion device, or reduced catalyst loading. In one embodiment, the rear and central portions of the high risk portion of the particulate filter 110 may comprise the first fraction of the high risk portion of the particulate filter 110, and the remainder of the high risk portion of the particulate filter 110 may comprise the second fraction of the high risk portion of the particulate filter 110.

The molecular energy dispersion device may comprise a particulate filter washcoat 306 of the high risk portion of the particulate filter 110, wherein the washcoat 306 comprises a heat sink material. The heat sink material may be configured to store heat energy as molecular energy other than temperature—for example as quantum vibrational energy—thereby dispersing the heat generated within the particulate filter 110 and reducing the peak temperature and temperature gradients achieved within the particulate filter 110.

In one embodiment, materials with relatively high mass and/or relatively high specific heat capacity function well as heat sink materials. The heat sink material need not be different from the material of the particulate filter 110 substrate, as the increase in mass targeted to the high risk portion of the particulate filter 110 will operate as a heat sink. The value of a material as a heat sink is related to the product of the material mass multiplied by the material specific heat capacity, and the material selection must weigh manufacturing considerations and material availability against the value of a material as a heat sink to select an appropriate material for a given application 104. In one embodiment, the heat sink material may comprise zirconia, boron nitride, silicon carbide, aluminum oxide, nickel aluminide, iron aluminide, Inconel®, and/or silicon nitride. Inconel® is a known high nickel-content alloy in the metallurgy industry.

Referring to FIG. 3, the space dispersion device may comprise a plurality of thermal conduits 308 configured to thermally connect the high risk portion of the particulate filter 110 to the ambient environment. The thermal conduits may thereby disperse heat from the high risk portion of the particulate filter 110 to the ambient environment. In one embodiment, the plurality of thermal conduits may disperse heat to the ambient environment by conducting the heat to end caps at the end of channels within the particulate filter 110.

The plurality of thermal conduits may comprise metal wires, material fibers, or structures within the particulate filter 110 channels. The plurality of thermal conduits should have a thermal conductivity greater than the thermal conductivity of the particulate filter substrate 304. The cross-sectional area of the plurality of thermal conduits 308 must be smaller than the cross-sectional area of the channels 206 but a wide range of cross-sectional areas for the thermal conduits 308 is otherwise acceptable. The pressure drop induced by the thermal conduits 308 is relatively small because the thermal conduits 308 may not be in every channel 206, and may not run the entire axial length of each channel 206. In one embodiment, thermal conduits 308 in the high risk portion of the particulate filter 110 with cross-sectional areas less than fifty-percent of the cross-sectional area of the channels 206 provide sufficient channel 206 flow area and acceptable filter 110 pressure drop.

The thermal conductivity necessary for the thermal conduits 308 varies with the application 104, and may depend upon the size and shape of the high risk portion of the particulate filter 110, the material comprising the particulate filter substrate 304, and the expected heat generation within the high risk portion of the particulate filter 110. The expected heat generation within the particulate filter 110 cannot be specified in advance because it depends upon application-specific 104 design criteria such as designed maximum soot loading within the particulate filter 104. However, these calculations are within the skill of one in the art.

In one embodiment, the thermal conduits may comprise an intermetallic compound. The intermetallic compound may comprise an alloy of more than one metal, or a metal-non-metal interstitial compound. For example, the thermal conduits may comprise a member formed from the group of compounds such as nickel aluminide, iron aluminide, silicon nitride, Inconel®, boron nitride, aluminum nitride, silicon carbide, and/or alumina. All of these materials, along with virtually any metal, have a thermal conductivity between about eight times greater and over one hundred times greater than cordierite, which may comprise the particulate filter substrate 304 in one embodiment.

Figure 4:
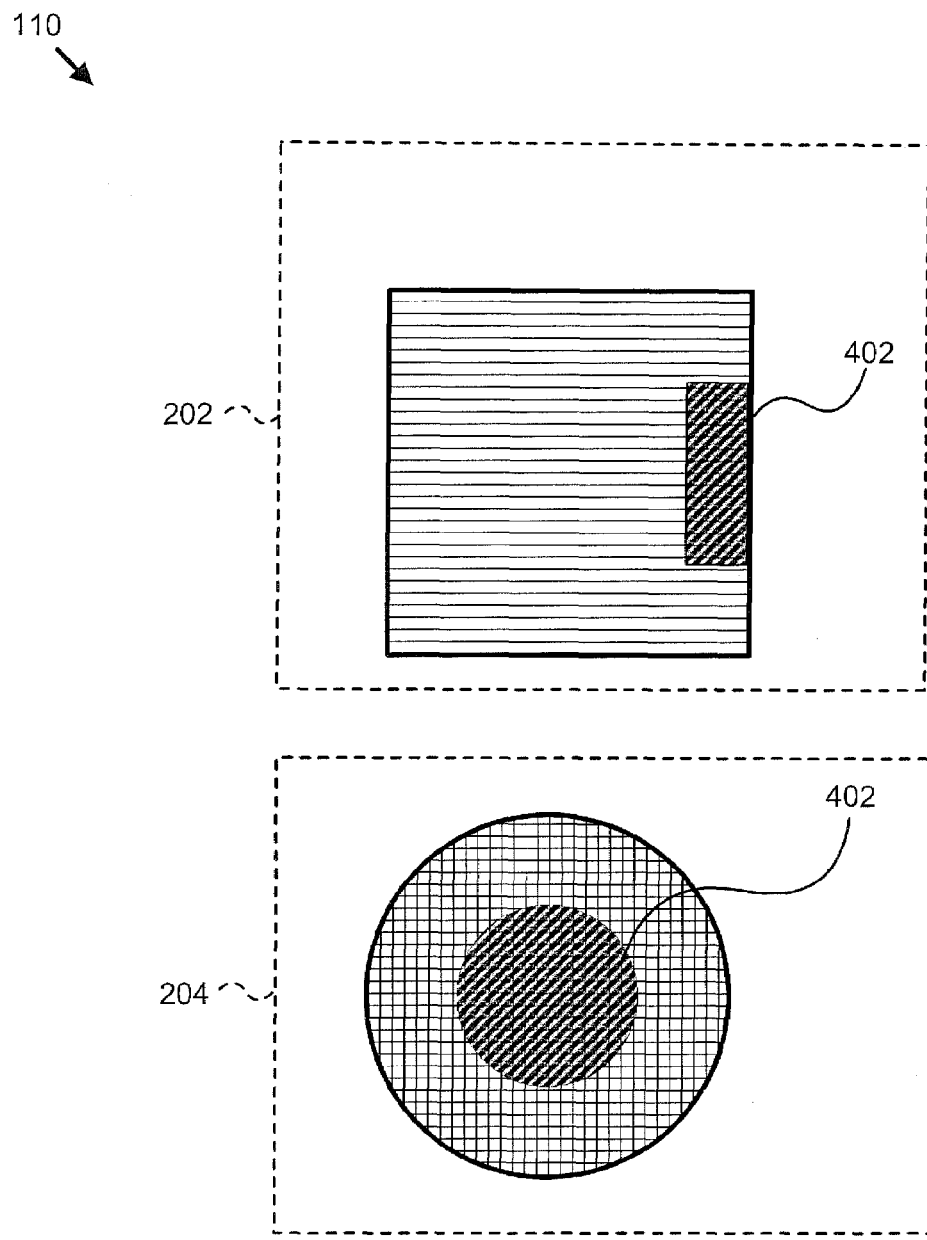
FIG. 4 is an illustration of one embodiment of a high risk portion of a particulate filter in accordance with the present invention.

FIG. 4 is an illustration of one embodiment of a high risk portion 402 of a particulate filter 110 in accordance with the present invention. A cutaway side view 202 and rear face view 204 are shown, where the high risk portion 402 comprises an area at the rear of the particulate filter 110 of twenty-five percent of the cross sectional area of the filter 110. The high risk portion 402 is axially positioned from the back of the particulate filter 110, forward to the rear one-sixth of the particulate filter 110. In one embodiment, this is the area of the particulate filter which experiences the highest temperature excursions and produces the most failures in the absence of the improvements of the present invention.

Figure 5:
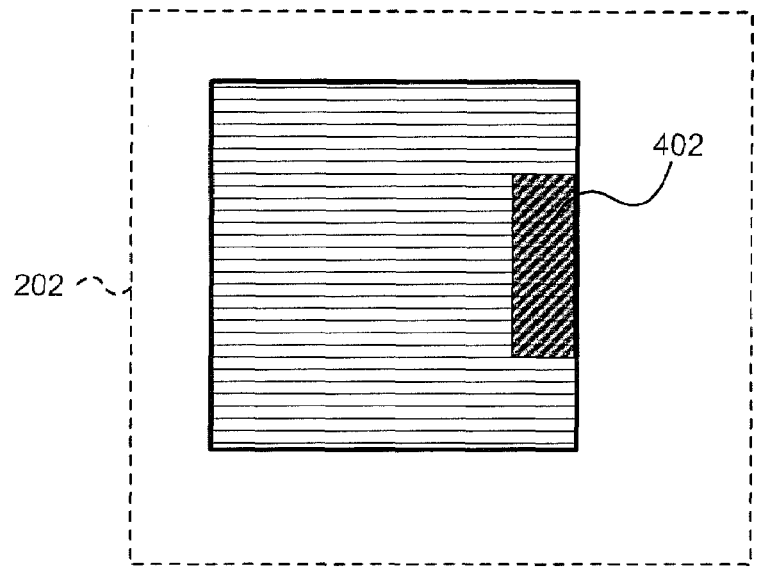
FIG. 5 is an illustration of an alternative embodiment of a high risk portion of a particulate filter in accordance with the present invention.
Figure 5:
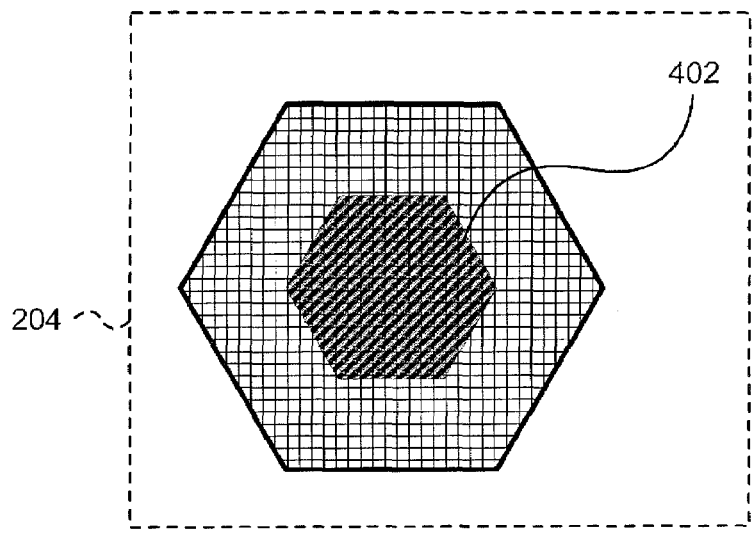

FIG. 5 is an illustration of an alternative embodiment of a high risk portion 402 of a particulate filter 110 in accordance with the present invention. A cutaway side view and rear face view 204 are shown, where the high risk portion 402 comprises a central shape with a cross-sectional shape shown in the rear face view 204 corresponding to the cross-sectional shape of the filter 110.

Figure 6:
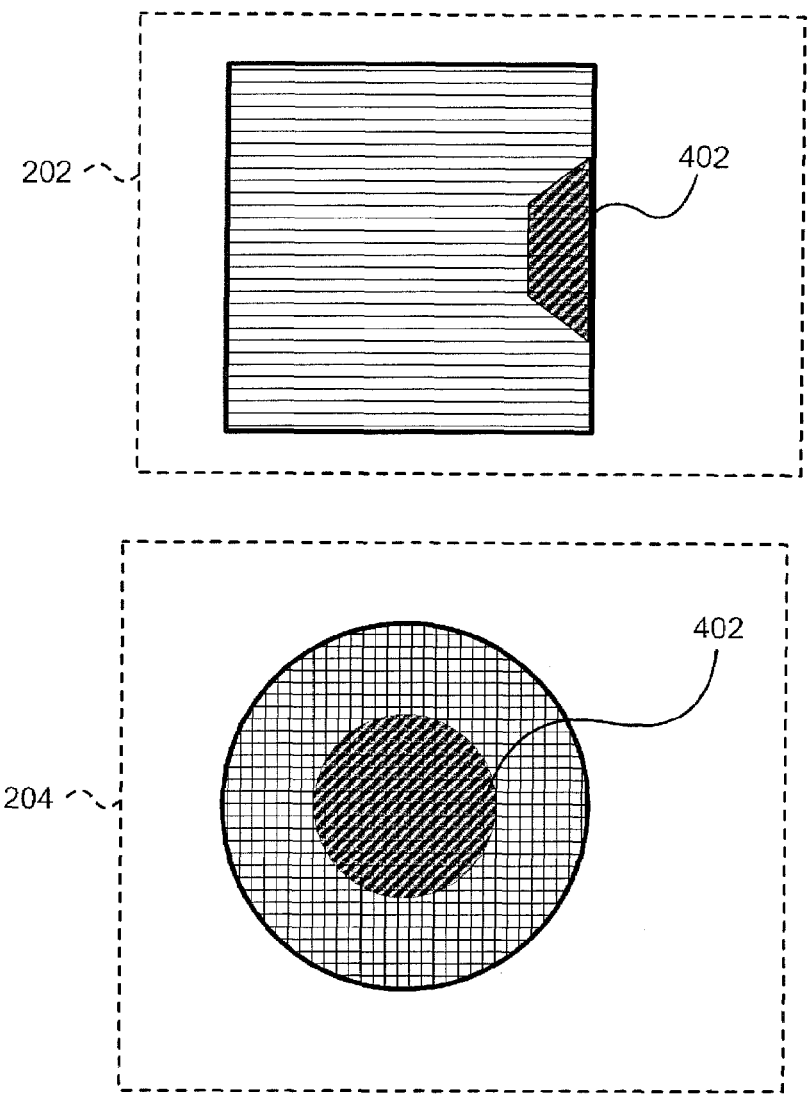
FIG. 6 is an illustration of an alternative embodiment of a high risk portion of a particulate filter in accordance with the present invention.

FIG. 6 is an illustration of an alternative embodiment of a high risk portion 402 of a particulate filter 110 in accordance with the present invention. A cutaway side view 202 and rear face view 204 are shown, where the high risk portion 402 comprises a frustum with a cross-sectional shape shown in the rear face view 204 corresponding to the cross-sectional shape of the filter 110. The large face of the frustum 402 is at the rear of the filter 110, and the small face of the frustum is axially positioned forward one-sixth of the length of the particulate filter 110. The ratio of the small face to large face may be different than that shown in FIG. 6, according to the high risk portion 402 of the particular application. The entire spectrum of frustum ratios from a cone, where the small face approaches zero area, to a cylinder where the small face approaches the area of the large face, are contemplated within the scope of the invention.

Figure 7:
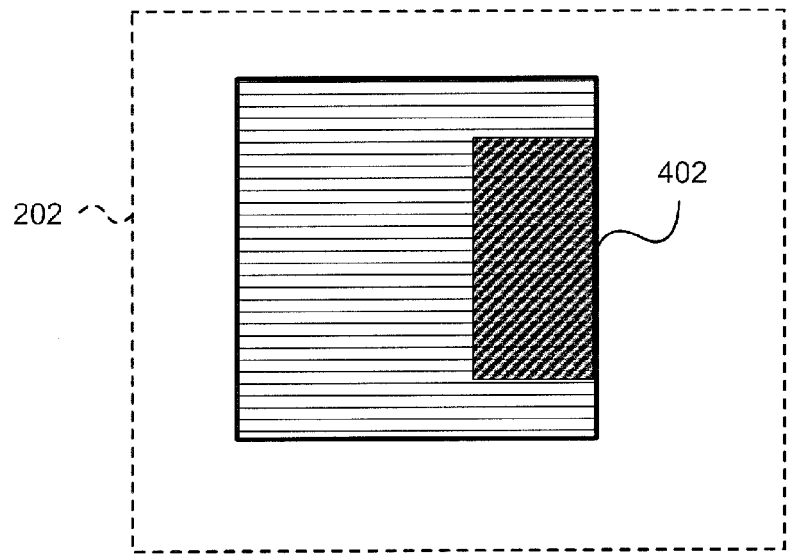
FIG. 7 is an illustration of an alternative embodiment of a high risk portion of a particulate filter in accordance with the present invention.
Figure 7:
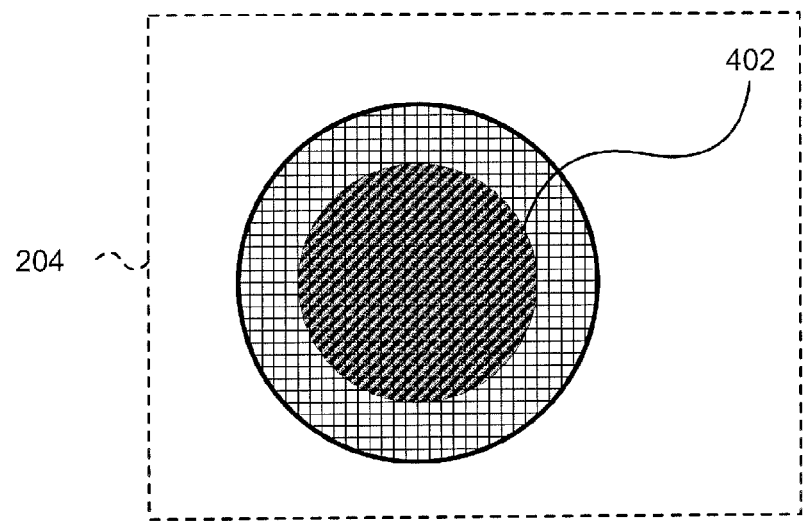

FIG. 7 is an illustration of an alternative embodiment of a high risk portion 402 of a particulate filter 110 in accordance with the present invention. The cross-sectional shape of the filter 110 may comprise a circle, and the high risk portion 402 may comprise a cylinder with a cross-sectional area forty-five percent of the area of the filter 110. The high risk portion 402 in the embodiment of FIG. 7 is axially positioned from the rear of the filter 110, forward to one-third of the length of the particulate filter 110.

Figure 8:
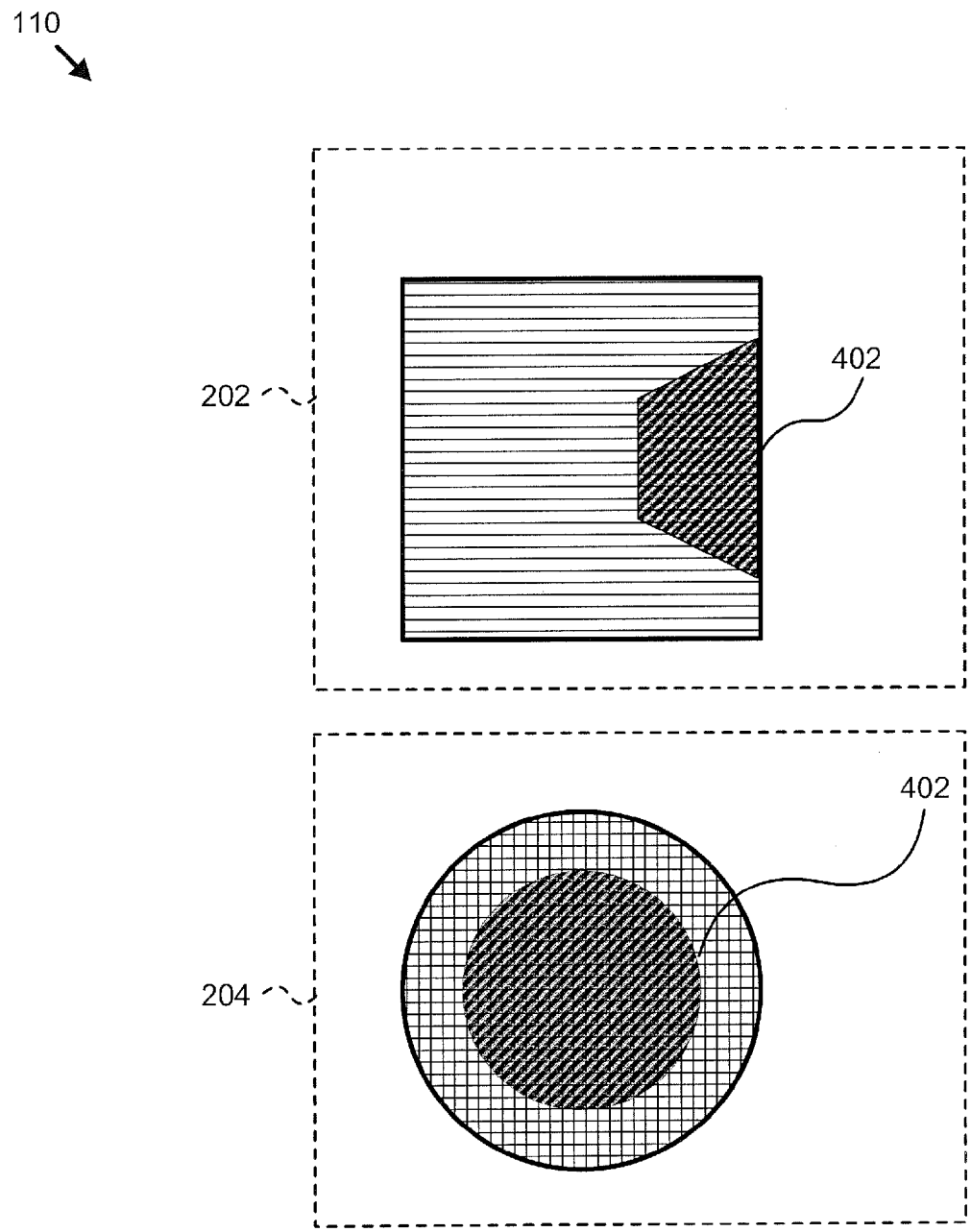
FIG. 8 is an illustration of an alternative embodiment of a high risk portion of a particulate filter in accordance with the present invention.

FIG. 8 is an illustration of an alternative embodiment of a high risk portion of a particulate filter 110 in accordance with the present invention. The cross-sectional shape of the filter 110 may comprise a circle, and the high risk portion 402 may comprise a cylindrical frustum with a cross-sectional area at the large face of forty-five percent of the area of the filter 110.

Figure 9A:
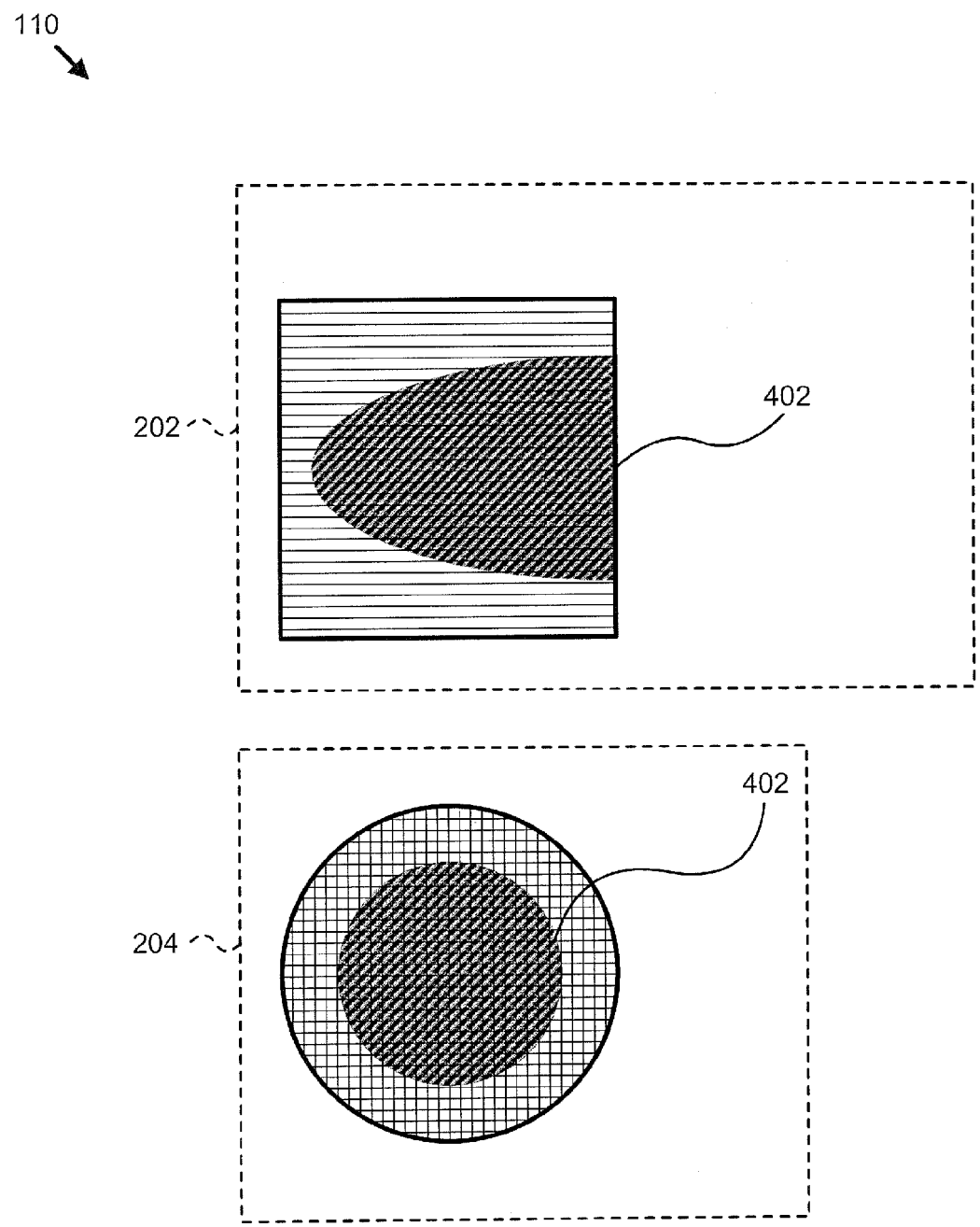
FIG. 9A is an illustration of an alternative embodiment of a high risk portion of a particulate filter in accordance with the present invention.
Figure 9B:
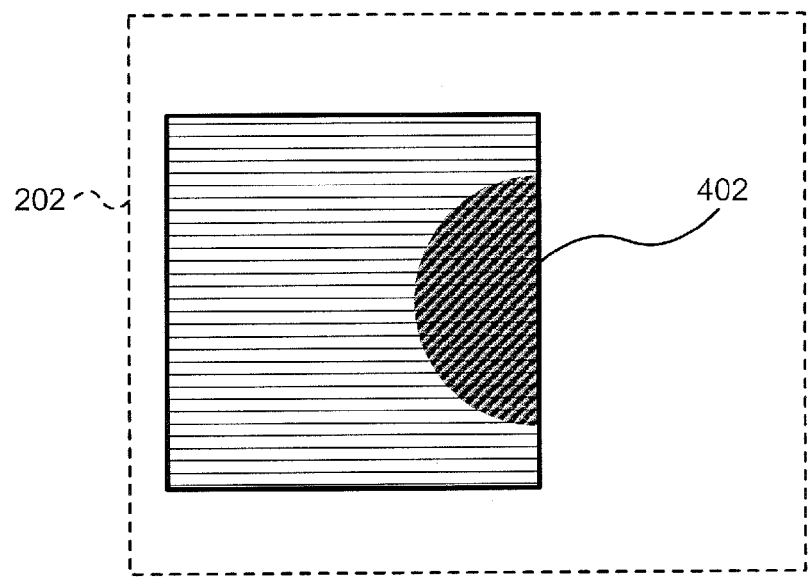
FIG. 9B is an illustration of an alternative embodiment of a high risk portion of a particulate filter in accordance with the present invention.
Figure 9B:
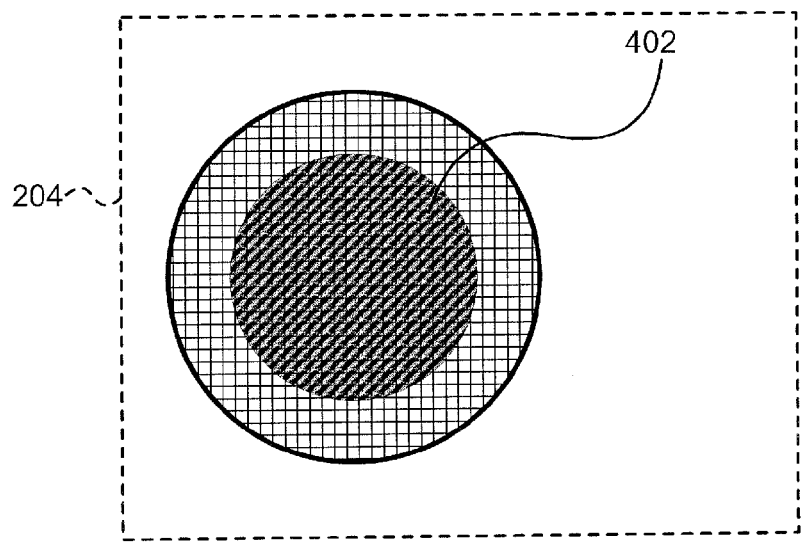

FIG. 9A is an illustration of an alternative embodiment of a high risk portion 402 of a particulate filter 110 in accordance with the present invention. FIG. 9B is an illustration of an alternative embodiment of a high risk portion 402 of a particulate filter 110 in accordance with the present invention. The embodiments of FIGS. 9A and 9B illustrate a filter 110 with a cross-sectional shape comprising a circle, and wherein the high risk portion 402 comprises a prolate hemi-spheroid. The embodiment of FIG. 9A illustrates a hemi-spheroid with an eccentricity of 0.93, and the embodiment of FIG. 9B illustrates a hemi-spheroid with an eccentricity of zero (or a hemisphere). The embodiments of FIGS. 9A and 9B illustrate a cross-sectional area at the large face of the hemi-spheroid equal to forty-five percent of the cross-sectional area of the particulate filter 110. Hemi-spheroids with a smaller cross-sectional area and with a higher eccentricity value than those shown in FIGS. 9A and 9B are possible in some embodiments.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
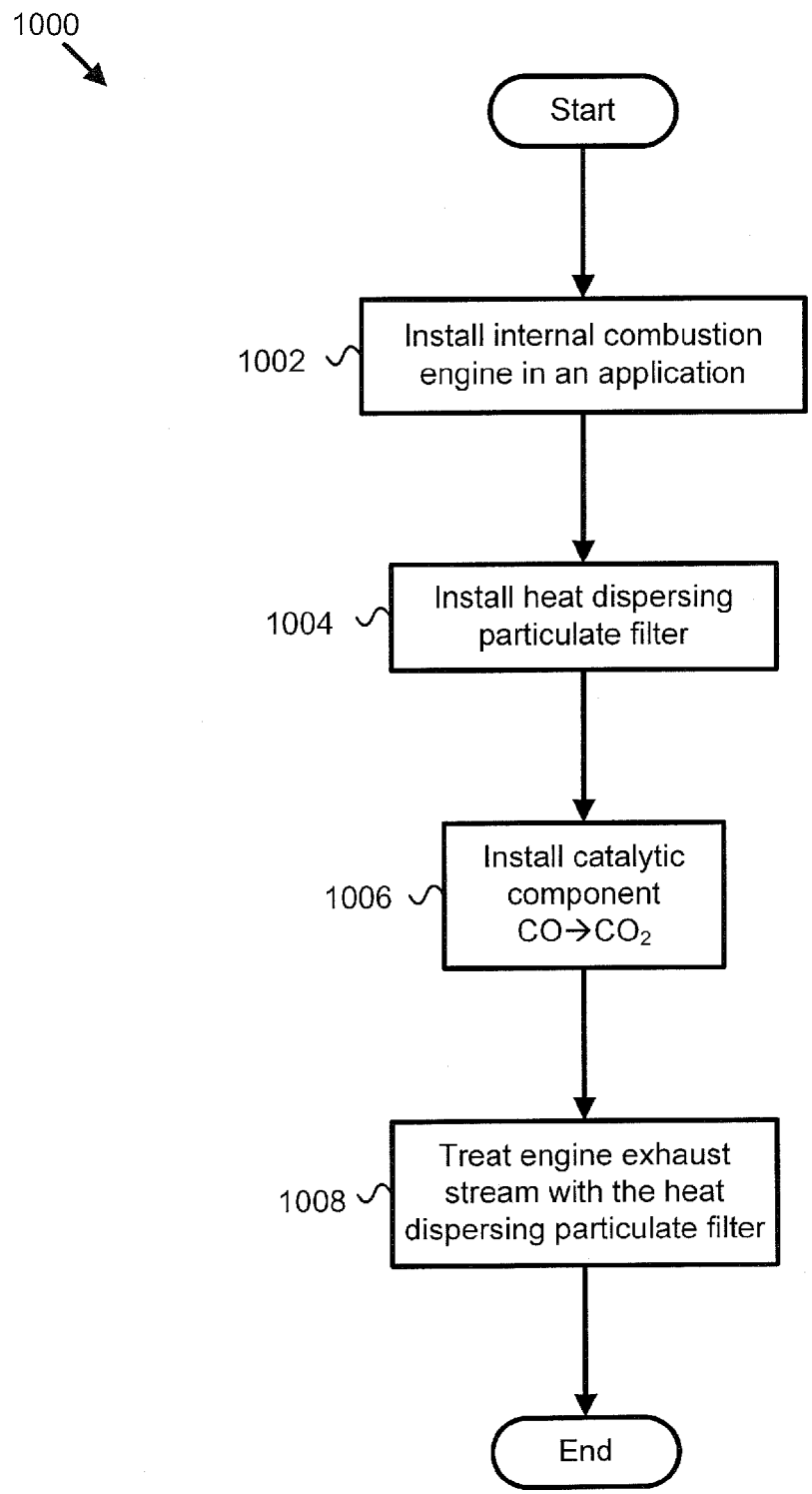
FIG. 10 is a schematic flow chart illustrating one embodiment of a method for providing a robust emissions compliant power plant for an application in accordance with the present invention.

FIG. 10 is a schematic flow chart illustrating one embodiment of a method 1000 for providing a robust emissions compliant power plant for an application 104 in accordance with the present invention. The method 1000 may begin with a practitioner installing 1002 an internal combustion engine 102 in an application 104 which may comprise vehicle. The practitioner may then install 1004 a heat dispersing particulate filter 110, which may comprise at least one of a time dispersion device, a component dispersion device, a molecular energy dispersion device, and a space dispersion device. The method 1000 may further comprise installing 1006 a catalytic component 112 configured to convert carbon monoxide to carbon dioxide.

The method 1000 may then include the practitioner treating 1008 the engine 102 exhaust with the heat dispersing particulate filter 110. The method 1000 may thereby provide a robust emissions compliant power plant for an application 104.

From the foregoing discussion, it is clear that the invention provides a system, method, and apparatus for dispersing heat within a particulate filter. The invention further provides a method for providing a robust emissions compliant power plant for an application. The invention overcomes previous limitations in the art by providing direct physical protection for a particulate filter against temperature spikes and gradients.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for dispersing heat in a particulate filter, the apparatus comprising:

a particulate filter having a plurality of channels through which an exhaust stream is flowable, the plurality of channels comprising inlet channels each being open at an inlet end of the filter and closed at an outlet end of the filter and outlet channels each being closed at the inlet end of the filter and open at the outlet end of the filter, wherein the closed outlet end of each of the inlet channels is closed via an end cap, and wherein the particulate filter comprises a high risk portion, wherein the high risk portion comprises a central shape with a cross-sectional area at the rear of the particulate filter of at least ten percent of the cross-sectional area of the particulate filter, and axially positioned from the back of the particulate filter forward to at least the rear one-sixth of the particulate filter; and a plurality of thermal conduits each positioned within a respective one of the plurality of inlet channels and having thermal conductivity greater than thermal conductivity of a particulate filter substrate, each thermal conduit extending axially along at least the portion of the respective inlet channel within the high risk portion of the particulate filter, each thermal conduit being thermally coupled to the end cap closing the respective inlet channel, and each thermal conduit having a cross-sectional area less than a cross-sectional area of the respective inlet channel such that the thermal conduits do not prevent exhaust flow through the inlet channels;

wherein the thermal conduits are configured to thermally connect the high risk portion of a particulate filter with an ambient environment.

2. The apparatus of claim 1, wherein the plurality of thermal conduits comprise one of a plurality of metal wires, a plurality of material fibers, and a plurality of structures.

3. The apparatus of claim 1, wherein thermally connecting the high risk portion of the particulate filter with the ambient environment comprises thermally connecting the high risk portion of the particulate filter with the inlet channel end caps.

4. The apparatus of claim 1, wherein the thermal conductivity of the plurality of thermal conduits comprises a value at least seven times greater than the thermal conductivity of the particulate filter substrate.

5. The apparatus of claim 1, wherein the plurality of thermal conduits further comprise a member formed from an intermetallic compound.

6. The apparatus of claim 1, wherein the plurality of thermal conduits further comprise a member formed from the group consisting of nickel aluminide, iron aluminide, silicon nitride, and Inconel®.

7. The apparatus of claim 1, wherein the plurality of thermal conduits further comprise a member formed from the group consisting of boron nitride, aluminum nitride, silicon carbide, and alumina.

8. The apparatus of claim 1, wherein the high risk portion comprises a central shape with a cross-sectional shape corresponding to the cross-sectional shape of the particulate filter.

9. The apparatus of claim 1:
wherein the high risk portion comprises a frustum with a cross-sectional shape corresponding to the cross-sectional shape of the particulate filter; and
wherein the large face of the frustum is at the rear of the particulate filter, and the small face of the frustum is axially positioned forward at least one-sixth of the length of the particulate filter.

10. The apparatus of claim 1:
wherein the cross-sectional shape of the particulate filter comprises a circle; and
wherein the high risk portion comprises a cylinder with a cross-sectional area at least forty-five percent of the area of the particulate filter.

11. The apparatus of claim 1:
wherein the cross-sectional shape of the particulate filter comprises a circle; and
wherein the high risk portion comprises a cylindrical frustum with a cross-sectional area at the large face of at least forty-five percent of the area of the particulate filter.

12. The apparatus of claim 1:
wherein the cross-sectional shape of the particulate filter comprises a circle; and
wherein the high risk portion comprises a prolate hemi-spheroid with a major axis axially aligned with the particulate filter and with an eccentricity between zero and 0.93 inclusive, wherein the cross-sectional area of the hemi-spheroid at the large face comprises at least forty-five percent of the area of the particulate filter.

13. The apparatus of claim 1, further comprising a particulate filter washcoat on the high risk portion of the particulate filter comprising a reduced precious metal catalyst loading.

14. The apparatus of claim 13, wherein the reduced precious metal catalyst loading comprises a precious metal catalyst loading between 10 percent and 30 percent of the precious metal catalyst loading on the remainder of the particulate filter.

15. The apparatus of claim 1, further comprising a particulate filter washcoat on the high risk portion of the particulate filter comprising a heat sink material.

16. The apparatus of claim 15, wherein the heat sink material comprises a member formed from the group consisting of zirconia, boron nitride, silicon carbide, aluminum oxide, nickel aluminide, iron aluminide, Inconel®, and silicon nitride.

17. The apparatus of claim 1, further comprising a particulate filter washcoat on the high risk portion of the particulate filter comprising substantially zero percent precious metal catalyst.

18. The apparatus of claim 17, further comprising a catalytic component downstream of the particulate filter, wherein the catalytic component is configured to convert a portion of carbon monoxide in an exhaust stream to carbon dioxide.

19. A method for providing a robust emissions compliant power plant for an application having an internal combustion engine, the method comprising:
installing a heat-dispersing particulate filter downstream of the internal combustion engine;
wherein the heat-dispersing particulate filter comprises a plurality of channels through which an exhaust stream is flowable, wherein the plurality of channels comprises inlet channels each being open at an inlet end of the filter and closed at an outlet end of the filter and outlet channels each being closed at the inlet end of the filter and open at the outlet end of the filter, and wherein the closed outlet end of each of the inlet channels is closed via an end cap, the heat-dispersing particulate filter further comprising a plurality of thermal conduits each positioned within a respective one of the plurality of inlet channels, each thermal conduit having a cross-sectional area less than a cross-sectional area of the respective inlet channel such that the thermal conduits do not prevent exhaust flow through the inlet channels, and wherein the thermal conduits are thermally coupled to the end cap closing the respective inlet channel to disperse heat from a high risk portion of the particulate filter to an ambient environment; and
treating an exhaust stream from the internal combustion engine with the engine heat-dispersing particulate filter to remove particulates from the exhaust stream.

20. The method of claim 19, wherein the particulate filter comprises a washcoat adjustment in the high risk portion of the particulate filter, the washcoat adjustment comprising one of a reduced precious metal catalyst loading, and a high heat capacity.

21. The method of claim 19, wherein the wherein the reduced precious metal catalyst loading comprises a precious metal catalyst loading between 10 percent and 30 percent of the precious metal catalyst loading on the remainder of the particulate filter.

22. The method of claim 19, wherein the reduced-catalyst washcoat comprises a washcoat with a zero percent catalyst fraction.

23. The method of claim 22, further comprising installing a catalytic component downstream of the heat-dispersing particulate filter, the catalytic component configured to convert carbon monoxide to carbon dioxide.

24. The method of claim 19, wherein each of the plurality of thermal conduits is substantially non-porous.

25. An apparatus for thermal management within a particulate filter, the apparatus comprising:
a heat dispersion device configured to disperse heat in a high risk portion of a particulate filter having a plurality of channels through which an exhaust stream is flowable, the high risk portion being axially positioned from a back of the particulate filter forward to at least the rear one-sixth of the particulate filter, and the heat dispersion device comprising at least one member selected from the group consisting of a time dispersion device, a component dispersion device, a molecular energy dispersion device, and a space dispersion device;
wherein the time dispersion device comprises a precious metal catalyst reduction in a washcoat of the high risk portion of the particulate filter configured to reduce a rate of soot consumption during a high temperature regeneration event;
wherein the component dispersion device comprises a washcoat comprising zero percent catalyst of the high risk portion of the particulate filter, and a catalytic component downstream of the particulate filter configured to convert carbon monoxide to carbon dioxide;

wherein the molecular energy dispersion device comprises a particulate filter washcoat of the high risk portion of the particulate filter comprising a heat sink material; and wherein the space dispersion device comprises a plurality of thermal conduits thermally connecting the high risk portion of the particulate filter with a plurality of particulate filter channel end caps, the plurality of thermal conduits each being positioned within a respective one of the plurality of channels and having a thermal conductivity greater than the thermal conductivity of the particulate filter substrate, wherein each thermal conduit extends axially along at least the portion of the respective channel within the high risk portion of the particulate filter.

26. The apparatus of claim 25, wherein the high risk portion comprises a central shape with a cross-sectional shape corresponding to the cross-sectional shape of the particulate filter.

27. The apparatus of claim 25, wherein the high risk portion comprises a frustum with a cross-sectional shape corresponding to the cross-sectional shape of the particulate filter, and wherein the large face of the frustum is at the rear of the particulate filter, the small face of the frustum is axially positioned forward at least one-sixth of the length of the particulate filter.

28. The apparatus of claim 25, wherein the cross-sectional shape of the particulate filter comprises a circle, and wherein the high risk portion comprises a prolate hemi-spheroid with a major axis axially aligned with the particulate filter and with an eccentricity between zero and 0.96 inclusive, wherein the cross-sectional area of the hemi-spheroid at the large face comprises at least twenty-five percent of the area of the particulate filter.

29. A system for providing a robust emissions compliant power plant for an application, the system comprising:

an internal combustion engine installed in an application;

an aftertreatment system configured to treat an exhaust stream from the internal combustion engine, the aftertreatment system comprising a heat-dispersing particulate filter comprising a plurality of channels through which an exhaust stream is flowable, a space dispersion device, and a component dispersion device, the particulate filter defining a high risk portion, wherein the plurality of channels comprises inlet channels each being open at an inlet end of the filter and closed at an outlet end of the filter and outlet channels each being closed at the inlet end of the filter and open at the outlet end of the filter, wherein the closed outlet end of each of the inlet channels is closed via an end cap;

wherein the component dispersion device comprises a washcoat comprising zero percent catalyst of at least a first fraction of the high risk portion of the particulate filter; and wherein the space dispersion device comprises a plurality of thermal conduits each positioned within a respective one of the plurality of inlet channels and having a cross-sectional area less than a cross-sectional area of the respective inlet channel such that the thermal conduits do not prevent exhaust flow through the inlet channels, the plurality of thermal conduits each being thermally coupled to the end cap closing the respective inlet channel to thermally connect the high risk portion of the particulate filter with the plurality of particulate filter inlet channel end caps, the plurality of thermal conduits having a thermal conductivity greater than the thermal conductivity of the particulate filter substrate.

30. The system of claim 29, wherein the component dispersion device further comprises a catalytic component downstream of the particulate filter configured to convert carbon monoxide to carbon dioxide.

31. The system of claim 29, wherein the heat-dispersing particulate filter further comprises a time dispersion device comprising a precious metal catalyst reduction in a washcoat of at least a second fraction of the high risk portion of the particulate filter configured to reduce a rate of soot consumption during a high temperature regeneration event.

32. The system of claim 29, wherein the heat-dispersing particulate filter further comprises a molecular energy dispersion device comprising a particulate filter washcoat of the high risk portion of the particulate filter comprising a heat sink material.

33. The system of claim 29, wherein the high risk portion comprises a central shape with a cross-sectional shape corresponding to the cross-sectional shape of the particulate filter.

* * * * *